United States Patent
Louis

(10) Patent No.: US 6,512,661 B1
(45) Date of Patent: Jan. 28, 2003

(54) VERTICAL GIANT MAGNETORESISTANCE SENSOR UTILIZING AN INSULATING BIAS LAYER

(75) Inventor: Ernest Antony Louis, Milpitas, CA (US)

(73) Assignee: Read-Rite Corporation, Fremont, CA (US)

( * ) Notice: Subject to any disclaimer, the term of this patent is extended or adjusted under 35 U.S.C. 154(b) by 75 days.

(21) Appl. No.: 09/636,304

(22) Filed: Aug. 10, 2000

(51) Int. Cl.$^7$ .......................... G11B 5/127; G11B 5/39
(52) U.S. Cl. ................................. 360/324.12
(58) Field of Search ................................. 360/319, 322, 360/327.32, 327.31, 327.3, 110, 313, 324, 324.1, 324.12

(56) References Cited

U.S. PATENT DOCUMENTS

| | | | | |
|---|---|---|---|---|
| 5,247,413 A | * | 9/1993 | Shibata et al. | 360/319 |
| 5,546,254 A | * | 8/1996 | Gill | 360/327.31 |
| 5,557,492 A | * | 9/1996 | Gill et al. | 360/319 |
| 5,893,981 A | * | 4/1999 | Dovek et al. | 216/22 |
| 5,969,910 A | * | 10/1999 | Imagawa et al. | 360/110 |
| 6,157,510 A | * | 12/2000 | Schreck et al. | 360/77.06 |
| 6,278,589 B1 | * | 8/2001 | Gill | 360/314 |

* cited by examiner

Primary Examiner—Robert S. Tupper
Assistant Examiner—Julie Anne Watko
(74) Attorney, Agent, or Firm—Sawyer Law Group LLP

(57) ABSTRACT

A method and system for providing a magnetoresistive head that reads data from a recording media is disclosed. The method and system include providing a first shield, a second shield, a magnetoresistive sensor, at least one insulating bias layer and a lead. The first shield has a first end, a central portion and a second end. The first end is closer to the recording media during use than the second end. The second shield has a first end, a central portion, and a second end. The first end of the second shield is preferably separated from the first end of the first shield by a read gap. The central portion of the second shield is preferably separated from the central portion of the first shield by a distance that is greater than the read gap. The magnetoresistive sensor is disposed between the first shield and the second shield and has a front end and a back end. The front end of the magnetoresistive sensor is electrically coupled with the first end of the first shield or the first end of the second shield. The at least one insulating bias layer is magnetically coupled to the magnetoresistive sensor and magnetically biases at least a portion of the magnetoresistive sensor. The lead is electrically coupled with the back end of the magnetoresistive sensor. Thus, current is driven through the magnetoresistive sensor in a direction substantially perpendicular to the recording media during use.

27 Claims, 11 Drawing Sheets

VERTICAL GIANT MAGNETORESISTANCE SENSOR UTILIZING AN INSULATING BIAS LAYER

CROSS-REFERENCE TO RELATED APPLICATIONS

The present application is related to U.S. patent application Ser. No. 09/436,979 filed on Nov. 9, 1999 now U.S. Pat. No. 6,456,465 entitled "VERTICAL GIANT MAGNETORESISTANCE SENSOR USING A RECESSED SHIELD" and assigned to the assignee of the present application.

FIELD OF THE INVENTION

The present invention relates to magnetic recording technology, and more particularly to a giant magnetoresistive read head which is capable of being used at high magnetic recording densities and which has reduced noise.

BACKGROUND OF THE INVENTION

Magnetoresistive ("MR") heads are currently used in read heads or for reading in a composite head. FIGS. 1A and 1B depict a conventional MR head 10 which uses a MR sensor 30, preferably a spin valve. FIG. 1A depicts a side view of the conventional MR head 10. For clarity, only a portion of the conventional MR head 10 is depicted. Also shown is the surface of the recording media 40. Thus, the air-bearing surface (ABS) is shown. Depicted in FIG. 1A are the first shield 14, the second shield 22, the MR sensor 30 and the leads 19a and 19b. Also shown is the height of the MR sensor 30, also known as the stripe height (h).

FIG. 1B depicts the conventional MR head 10 as viewed from the ABS. The MR head 10 includes a first shield 14 formed on a substrate 12. The MR head 10 also includes a first gap 16 separating a MR sensor 30 from the first shield 14. The MR head 10 also includes a pair of hard bias layers 18a and 18b. The hard bias layers 18a and 18b magnetically bias layers in the MR element 30. The MR head 10 also includes lead layers 19a and 19b, which conduct current to and from the MR sensor 30. A second gap 20 separates the MR sensor 30 from a second shield 22. When brought in proximity to a recording media (not shown), the MR head 10 reads data based on a change in the resistance of the MR sensor 30 due to the field of the recording media. Thus, the current through the MR sensor flows across the ABS, for example from left to right, or vice-versa, in both FIGS. 1A and 1B.

Giant magnetoresistance ("GMR") has been found to provide a higher signal for a given magnetic field. Thus, GMR is increasingly used as a mechanism for conventional higher density MR sensors 30. One MR sensor 30 which utilizes GMR to sense the magnetization stored in recording media is a conventional spin valve. FIG. 1C depicts one conventional GMR sensor 30, a conventional spin valve. The conventional GMR sensor 30 typically includes a seed layer 31, a pinning layer that is typically an antiferromagnetic ("AFM") layer 32, a pinned layer 34, a spacer layer 36, a free layer 38, and a capping layer 39. The seed layer is used to ensure that the material used for the AFM layer 32 has the appropriate crystal structure and is antiferromagnetic in nature. The spacer layer 36 is a nonmagnetic metal, such as copper. The pinned layer 34 and the free layer 38 are magnetic layers, such as CoFe. The magnetization of the pinned layer 34 is pinned in place due to an exchange coupling between the AFM layer 32 and the pinned layer 34. The magnetization of the free layer 38 is free to rotate in response to the magnetic field of the recording media 40. However, note that other conventional GMR sensors, such as conventional dual spin valves, conventional synthetic spin valves, and spin filters, are also used.

More recently, another configuration for conventional MR heads has been disclosed. FIG. 2 depicts a side view of a conventional MR head 50 in which current is driven perpendicular to the ABS. Also depicted is the recording media 40. The MR head 50 utilizes the MR sensor 30. Thus, the MR head 50 typically uses some sort of spin valve as the MR sensor 30. However, the MR head 50 could use another type of MR sensor (not shown), such as an AMR sensor. Regardless of the type of MR sensor used, the MR head 50 uses a vertical sensor, through which current is driven perpendicular to the ABS. As viewed from the ABS, the MR sensor 30 would generally appear as shown in FIG. 1C.

Referring back to FIG. 2, the MR head 50 also includes the first shield 52, the first gap 54, a conductor 56 that connects the MR sensor 30 to the first shield 52, the lead 58, the second gap 60 and the second shield 62. Also shown is the stripe height of the MR sensor 30, h, and the read gap 64. Current is driven through the MR sensor 30 between the first shield 52 and the lead 58. Thus, current is either parallel or antiparallel to the current direction 66 depicted in FIG. 2.

The conventional MR head 50 has advantages over the conventional MR head 10. In particular, the conventional MR head 50 may be more suitable for reading higher areal density media because of the direction of current flow through the MR head 50. The desired resistance of the MR sensor 30 can be provided in the MR head 50 by adjusting the stripe height, h. At the same time, the width of the MR sensor 30, as seen from the air-bearing surface (left to right in FIG. 1B), can be made small enough to be used with recording media 40 having a smaller track width. Thus, the conventional MR head 50 is of interest for high areal density recording applications.

Although the conventional MR head 50 functions, one of ordinary skill in the art will readily realize that there are drawbacks to the conventional MR head 50. Referring to FIGS. 1A–C and 2, the MR sensor 30 of the conventional MR head 50 is subject to noise due to domain wall motion. In contrast to the MR head 10, the MR sensor 30 does not magnetically bias the free layer 38 of the MR sensor 30. The materials used to magnetically bias the free layer 38 in the MR head 10 are typically conductive hard magnetic layers 18a and 18b that are placed adjacent to the free layer 38 as viewed from the ABS. These hard magnetic layers are typically materials such as CoCrPt and CoPt, which are conductive. However, if such hard magnetic layers 18a and 18b are placed at the sides of the free layer 38 in the conventional MR head 50, the hard magnetic layers 18a and 18b will shunt current away from the MR sensor 30. The signal from the MR sensor 30 would thus be lowered, which is undesirable.

In order to prevent the shunting of current away from the MR sensor 30 in the conventional MR head 50, no hard magnetic layers are used. However, this results in a free layer 38 of the MR sensor 30 that may have multiple domains. When the free layer 38 is subject to an external field, for example from the recording media 40, the magnetization of the free layer 38 changes in response to the external field. The walls between the domains in the free layer 38 move to change the magnetization of the free layer 38. The domains which form and the ways in which the domain walls move is not repeatable. Thus, the formation of a multi-domain state in the free layer 38 leads to domain wall movement, thereby producing non-linearity and noise in the sensor signal. Such non-linearity and noise are undesirable in the MR head 50 during operation.

There is an additional limiting factor to the height of the conventional MR sensor 30. As magnetic flux travels up the conventional MR sensor 30, away from the recording media 40, flux leaks out of the conventional MR sensor 30. The shield 14 and 22 and the shields 52 and 62 are significantly larger than the conventional MR sensor 30. Thus, magnetic flux leaks out of the conventional MR sensor 30 and into the shields 14, 22, 52 and 62. The height at which virtually all of the magnetic flux has leaked out of the conventional MR sensor 30 is defined as the flux decay length. If the conventional MR sensor 30 is made longer than the flux decay length, the additional height of the conventional MR sensor 30 will contribute to the resistance in the MR head 50, but not to the magnetoresistance. Any additional height of the conventional MR sensor 30 will, therefore, be a source of parasitic resistance and thus be wasted.

Accordingly, what is needed is a system and method for providing a MR head which is capable of reading information stored on magnetic recording media at higher densities and in which is less subject to noise due to domain wall motion. The present invention addresses is such a need.

SUMMARY OF THE INVENTION

The present invention provides a method and system for providing a magnetoresistive head that reads data from a recording media. The method and system comprise providing a first shield, a second shield, a magnetoresistive sensor, at least one insulating bias layer and a lead. The first shield has a first end, a central portion and a second end. The first end is closer to the recording media during use than the second end. The second shield has a first end, a central portion, and a second end. The first end of the second shield is closer to the recording media during use than the second end of the second shield. The first end of the second shield is preferably separated from the first end of the first shield by a read gap. The central portion of the second shield is preferably separated from the central portion of the first shield by a distance that is greater than the read gap. The magnetoresistive sensor is disposed between the first shield and the second shield and has a front end and a back end. The front end of the magnetoresistive is closer to the recording media during use than the back end. The front end of the magnetoresistive sensor is electrically coupled with the first end of the first shield or the first end of the second shield. The at least one insulating bias layer is magnetically coupled to the magnetoresistive sensor and magnetically biases at least a portion of the magnetoresistive sensor. The lead is electrically coupled with the back end of the magnetoresistive sensor. Thus, current is driven through the magnetoresistive sensor in a direction substantially perpendicular to the recording media during use.

According to the system and method disclosed herein, the present invention provides a magnetoresistive head in which current is driven substantially perpendicular to the recording media. The magnetoresistive head has reduced signal instability due to domain wall formation and domain wall motion in the magnetoresistive sensor. In addition, the magnetoresistive head preferably has an increased flux decay length. The increased flux decay length can be taken advantage of because the direction in which current is driven. Consequently, the MR head may also be capable of reading higher density recording media.

DETAILED DESCRIPTION OF THE INVENTION

Figure 1A:
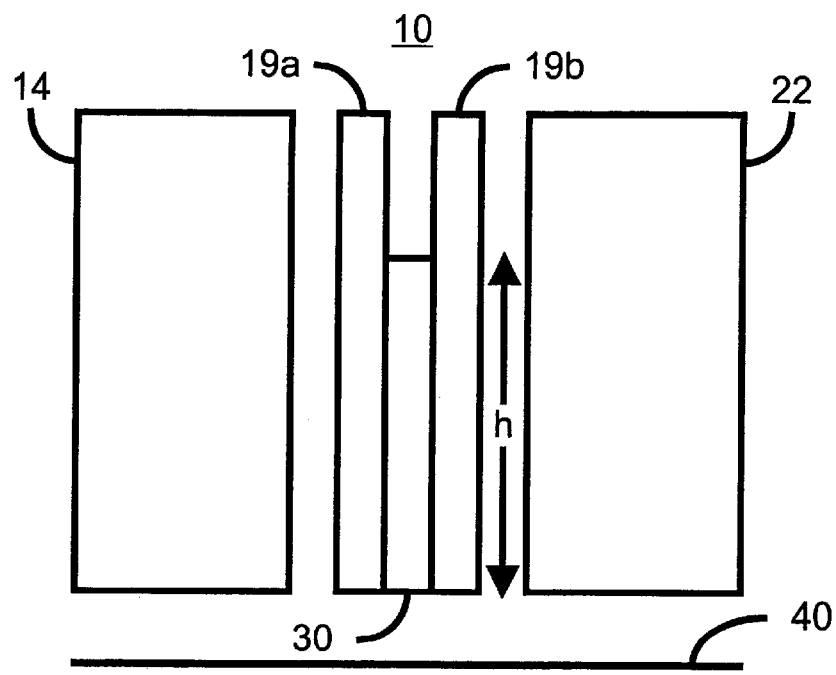
FIG. 1A is a side view of a conventional magnetoresistive head in which current is driven parallel to the air-bearing surface.
Figure 1B:
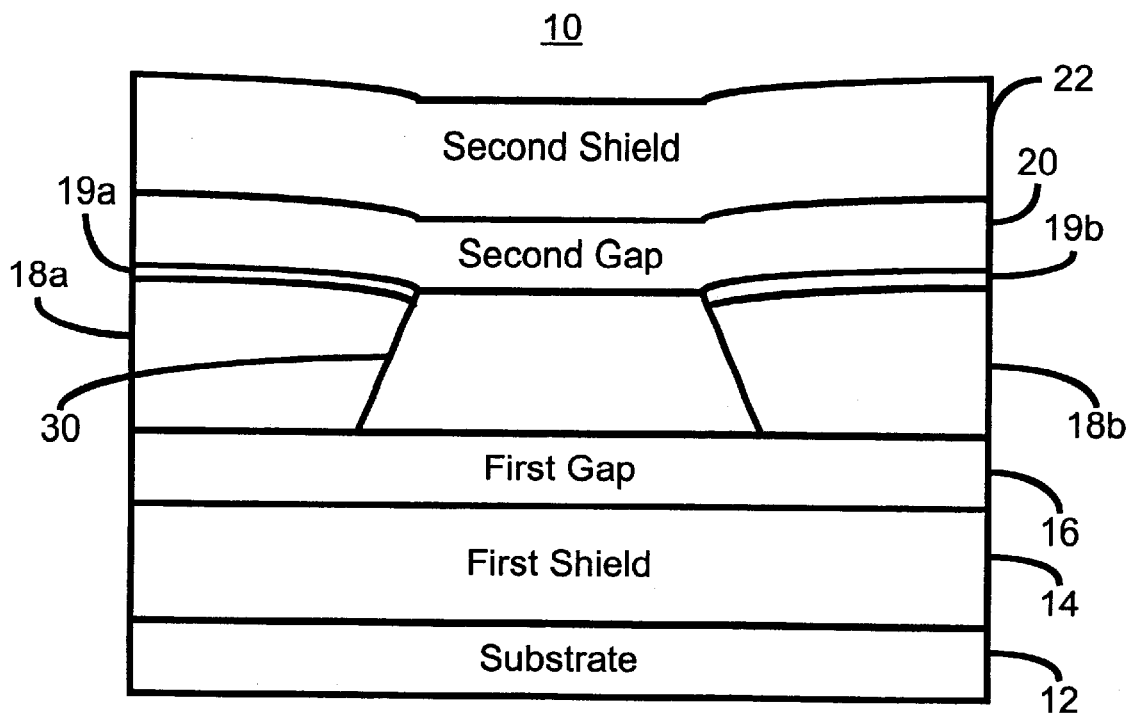
FIG. 1B is another, air-bearing surface view of the conventional magnetoresistive head.
Figure 1C:
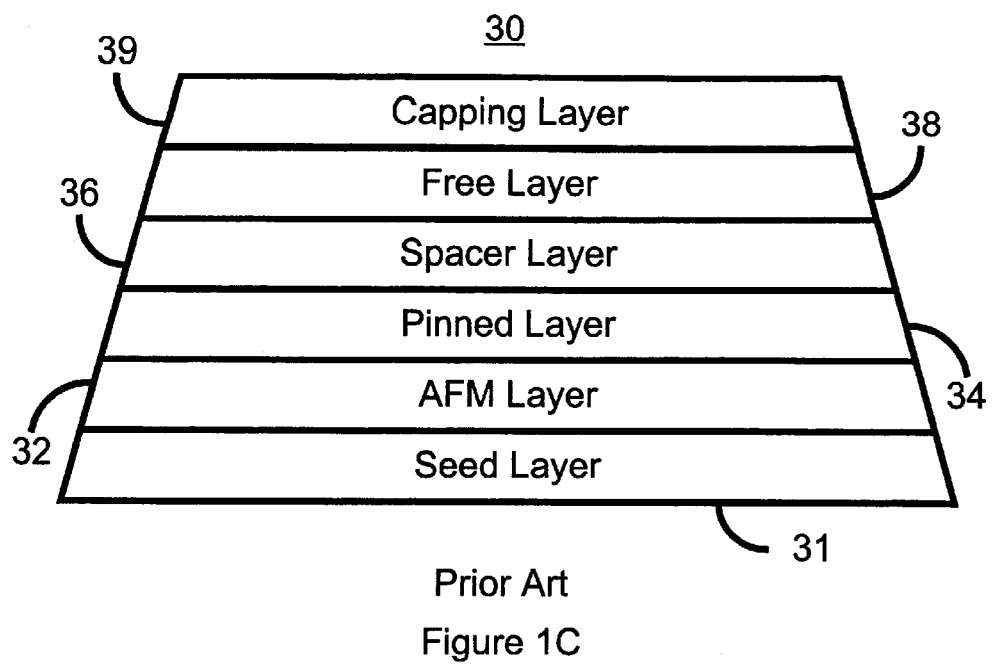
FIG. 1C is a diagram of a conventional MR sensor, a spin valve.

The present invention relates to an improvement in magnetoresistive heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional MR heads use conventional giant magnetoresistive MR sensors, such as spin valves. One conventional MR head that may be suitable for higher density recording applications drives current perpendicular to the recording media, or air-bearing surface ("ABS"). Although such a conventional MR head functions, one of ordinary skill in the art will readily realize that such a conventional MR head has drawbacks. Such a conventional MR head cannot use conventional techniques for magnetically biasing the MR sensor. For example, such a conventional MR head cannot use conductive hard magnetic materials for biasing the free layer of a conventional MR sensor because these materials would shunt current away from the MR sensor. Thus, the MR sensor signal is subject to noise due to multiple domains in the free layer of the MR sensor. In addition, it would be desirable if the conventional MR head could utilize a MR sensor having a higher length that contributes additional signal, or MR, to the conventional MR head.

Co-pending U.S. patent application Ser. No. 09/436,979 filed on Nov. 9, 1999, entitled "VERTICAL GIANT MAGNETORESISTANCE SENSOR USING A RECESSED SHIELD" and assigned to the assignee of the present application discloses a MR head which drives current perpendicular to the ABS and which has a longer flux decay length. Applicant hereby incorporates by reference the above-identified co-pending patent application. The MR head disclosed in the above-mentioned co-pending application has at least one recessed shield. For such a shield, the distance between the shields at the ABS is less than the distance between the shields farther from the ABS. As a result, the flux decay length is increased. When current is driven vertically, perpendicular to the ABS, additional signal can be obtained. Thus, the MR head disclosed in the above-mentioned co-pending application can be better optimized for reading high density recording media.

Although the MR head disclosed in the above-identified co-pending application functions well for its intended purpose, the MR head suffers from some of the same drawbacks as the conventional MR head. In particular, the MR head disclosed in the above-identified co-pending application does not magnetically bias the MR sensor. Thus, the MR head described in the above-mentioned co-pending application may still suffer from drawbacks due to a multiple domain free layer.

The present invention provides a method and system for providing a magnetoresistive head that reads data from a recording media. The method and system comprise providing a first shield, a second shield, a magnetoresistive sensor, at least one insulating bias layer and a lead. The first shield has a first end, a central portion and a second end. The first end is closer to the recording media during use than the second end. The second shield has a first end, a central portion, and a second end. The first end of the second shield is closer to the recording media during use than the second end of the second shield. The first end of the second shield is preferably separated from the first end of the first shield by a read gap. The central portion of the second shield is preferably separated from the central portion of the first shield by a distance that is greater than the read gap. The magnetoresistive sensor is disposed between the first shield and the second shield and has a front end and a back end. The front end of the magnetoresistive is closer to the recording media during use than the back end. The front end of the magnetoresistive sensor is electrically coupled with the first end of the first shield or the first end of the second shield. The at least one insulating bias layer is magnetically coupled to the magnetoresistive sensor and magnetically biases at least a portion of the magnetoresistive sensor. The lead is electrically coupled with the back end of the magnetoresistive sensor. Thus, current is driven through the magnetoresistive sensor in a direction substantially perpendicular to the recording media during use.

The present invention will be described in terms of particular materials used, a particular head, and a particular configuration of the MR head. However, one of ordinary skill in the art will readily recognize that this method and system will operate effectively for other materials and other head configurations consistent with the present invention. For example, the present invention is consistent with the use of a spin valve, a dual spin valve, a synthetic spin valve, a spin filter or other magnetoresistive sensor. The present invention can also be used with both top (free layer at the bottom) and bottom (free layer at the top) spin valves. In addition, the present invention is consistent with other combinations of recessed and non-recessed shields. The present invention can thus be applicable to all vertical MR sensors, including but not limited to GMR sensors such as spin valves and anisotropic MR (AMR) sensors, with or without one or more recessed shields. Furthermore, the present invention can be used in a simple read head, a merged head including a read head and a write head, or another head which utilizes a GMR sensor as described herein.

Figure 3A:
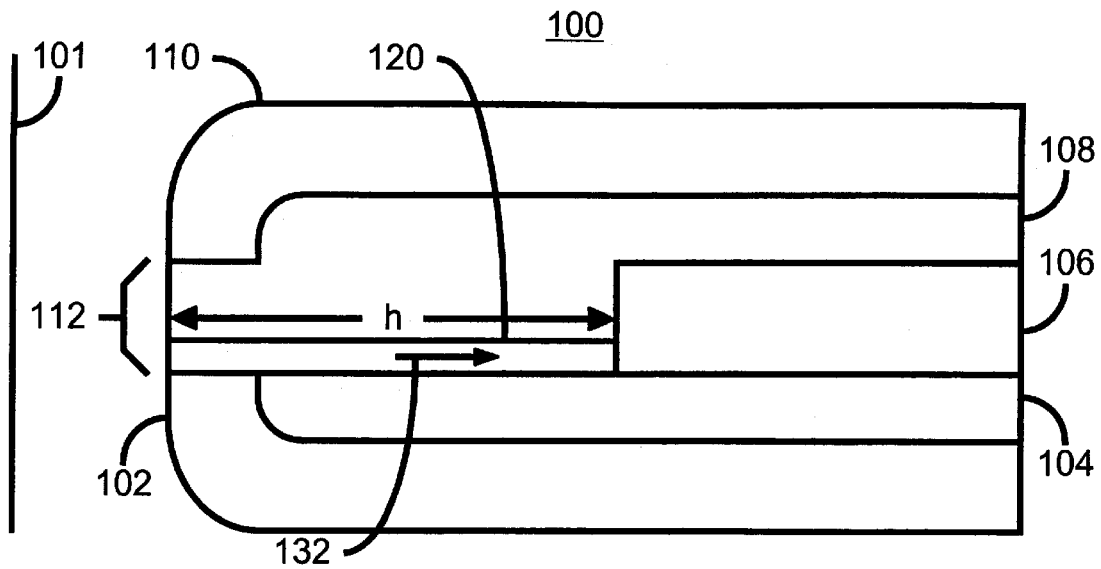
FIG. 3A is a side view of one embodiment of a magnetoresistive head in accordance with the present invention.
Figure 3B:
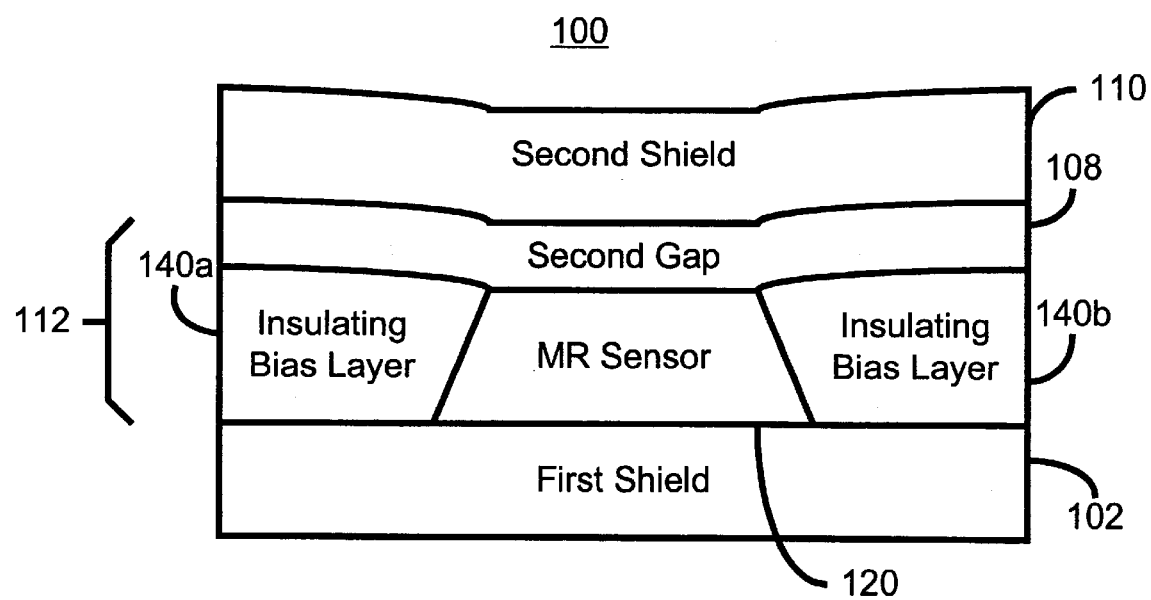
FIG. 3B is a diagram of a portion of one embodiment of the magnetoresistive head in accordance with the present invention as viewed from the air-bearing surface.

FIGS. 3A and 3B depict one embodiment of a MR head 100 in accordance with the present invention. FIG. 3A depicts a side view of the MR head 100, while FIG. 3B depicts a view of the MR head 100 from the ABS. Also depicted in FIG. 3A is a recording media 101 that is not part of the MR head 100. The MR head 100 includes a first shield 102, a MR sensor 120, a second shield 110, and a lead 106. A first gap 104 separates the first shield 102 from the MR sensor 120. A second gap 108 separates the second shield 110 from the MR sensor 120. The first shield 102 and second shield 110 prevent magnetic flux from bits not being read from reaching the MR sensor 120. The read gap 112 allows flux from the bit being read to reach the MR sensor 120. Thus, the size of the read gap 112 and, therefore, the separation between the first shield 102 and the second shield 110 at the read gap 112, is determined by the size of bits being read. The MR sensor 120 can be any MR sensor, including but not limited to a spin valve, a dual spin valve, a synthetic spin valve, a synthetic dual spin valve, or a spin filter. The MR sensor 120 has a stripe height, h. The portions of the shields 102 and 110 at the ABS (near the recording media 101) are separated by a read gap 112. The read gap 112 allows flux from a recording media 101 to reach the MR sensor 120.

The MR sensor 120 is coupled at the front end, closest to the recording media 101, with the end of the first shield 102.

The back end of the MR sensor 120 is coupled to the lead 106. Thus, the first shield 102 serves as a lead. Current is driven between the front end of the MR sensor 120 and the back end of the MR sensor 120, substantially perpendicular to the recording media 101. The preferred direction in which current is driven is depicted by the arrow 132. However, current can be driven in the opposite direction.

FIG. 3B depicts the MR head 100 in accordance with the present invention as viewed from the ABS. Because FIG. 3B depicts the MR head 100 at the ABS, the lead 106 and the first gap 104 are not seen. Instead, the MR sensor 120 is electrically coupled with the first shield 102. FIG. 3B also shows the second gap 108 and the second shield 110. In addition, the read gap 112 is also depicted. As discussed above, the read gap 112 is the spacing between the shields 102 and 110 near the ABS.

Also depicted in FIG. 3B are insulating bias layers 140a and 140b. The insulating bias layers 140a and 140b are preferably adjacent to the MR sensor 120. The insulating bias layers 140a and 140b are magnetic and have a magnetization that is preferably stable during operation of the MR head 100. The insulating bias layers 140a and 140b magnetically bias the MR sensor 120. The insulating bias layers 140a and 140b can do so without concern that their magnetization, and therefore the magnetic bias applied to the MR sensor 120, will change during use of the MR head 100. For example, when the MR sensor 120 is a spin valve, as discussed below, the insulating bias layers 140a and 140b magnetically bias the free layer of the spin valve. Thus, the free layer can be ensured to be single domain. Thus, drawbacks due to multiple domains in the free layer of the MR sensor 120 can be reduced or eliminated through the use of the insulating bias layers 140a and 140b.

The insulating bias layers 140a and 140b thus magnetically bias at least a portion of the MR sensor 120. In addition, the insulating bias layers 140a and 140b are electrical insulators. Thus, the resistance of the insulating bias layers 140a and 140b is significantly higher than that of the MR sensor 120. In one embodiment in which thin ferrite layers are used for the insulating bias layers 140a and 140b, the resistivity of the insulating bias layers 140a and 140b is greater than approximately $10^6$ $\mu\Omega$-cm. As a result, the insulating bias layers 140a and 140b do not shunt a great deal of current away from the MR sensor 120. When a bias current is driven through the MR sensor 120, between the first shield 102 and the lead 106, little of none of the bias current is redirected away from the MR sensor 120 through the insulating bias layers 140a and 140b. Consequently, the signal from the MR sensor 120 should remain high. Thus, the MR head 100 is suitable for use at higher recording densities.

Figure 2:
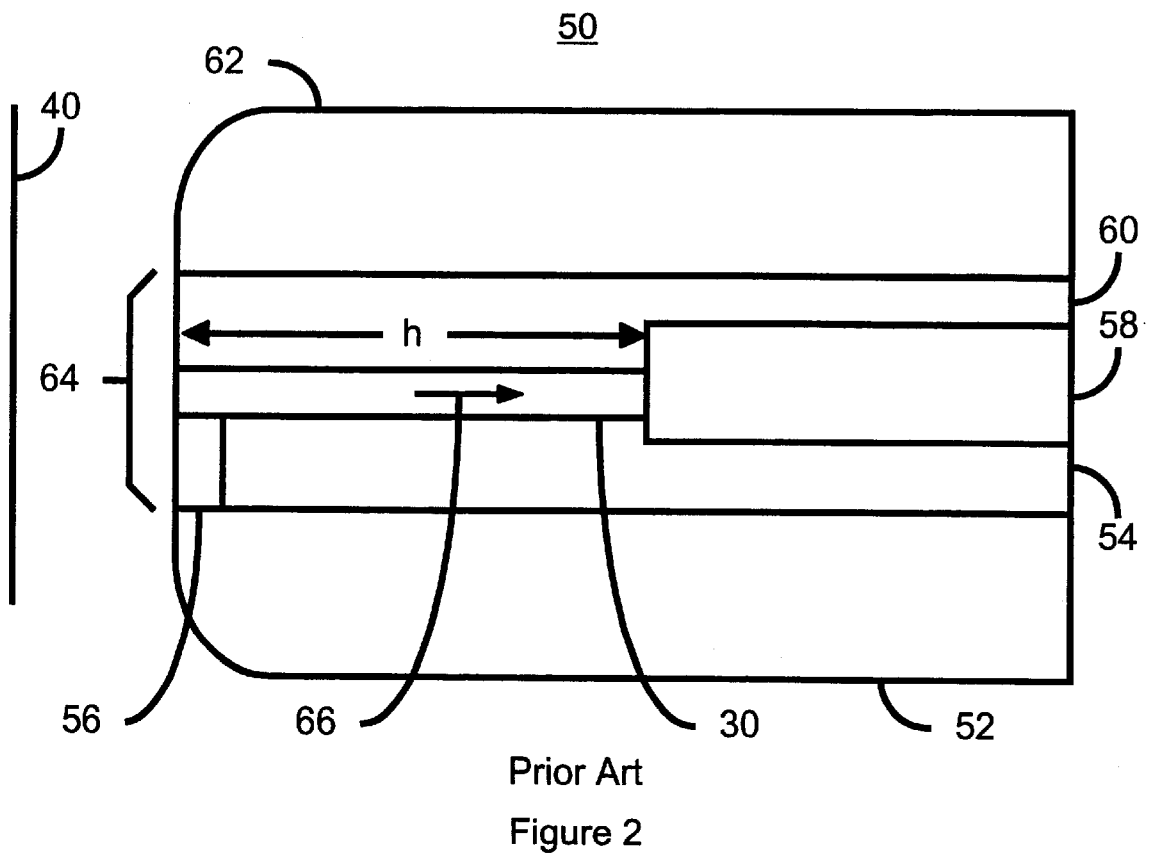
FIG. 2 is a diagram of a conventional magnetoresistive head in which current is driven perpendicular to the air-bearing surface.

The MR head 100 has an additional advantage. At least one of the shields 102 and 110 is recessed. As depicted in FIG. 3A, the first shield 102 is recessed. In other words, the first shield 102 has a greater spacing from the second shield 110 and from the MR sensor 120 away from the read gap 112. The central portions of the first shield 102 and the second shield 110 are separated by a greater distance than the end portions of the first shield 102 and the second shield 110 that are in proximity to the recording media 101. Thus, less magnetic flux per unit length leaks from the MR sensor 120 than in the conventional MR head 10 depicted in FIG. 2. Referring back to FIGS. 3A and 3B, because of the increased separation between the central portions of the first shield 102 and the second shield 110, the flux decay length of the MR sensor 120 is increased. In other words, the portion of the MR sensor 120 that is exposed to magnetic flux and which can, therefore, generate a signal is increased. As a result, a higher signal may be obtained from the MR head 100. This is achieved without having to increase the width of the MR sensor 120 as seen from the ABS, which corresponds to the track width for the recording media 101. Consequently, the MR head 100 generates a higher signal and is more suitable for use in reading high areal density recording media.

Furthermore, the MR head 100 is less subject to destruction of the MR sensor 120 due to electrostatic discharge (ESD). The MR sensor 120 is electrically shorted to the first shield 102. Shorting the MR sensor 120 to the first shield 102 provides a low resistance path, through the first shield 110, for dissipating an electrostatic charge. A charge residing on the MR sensor 120 or another portion of the MR head 100 may be shunted through the first shield 102. Consequently, the MR sensor 120 is also protected from destruction due to ESD.

Figure 3C:
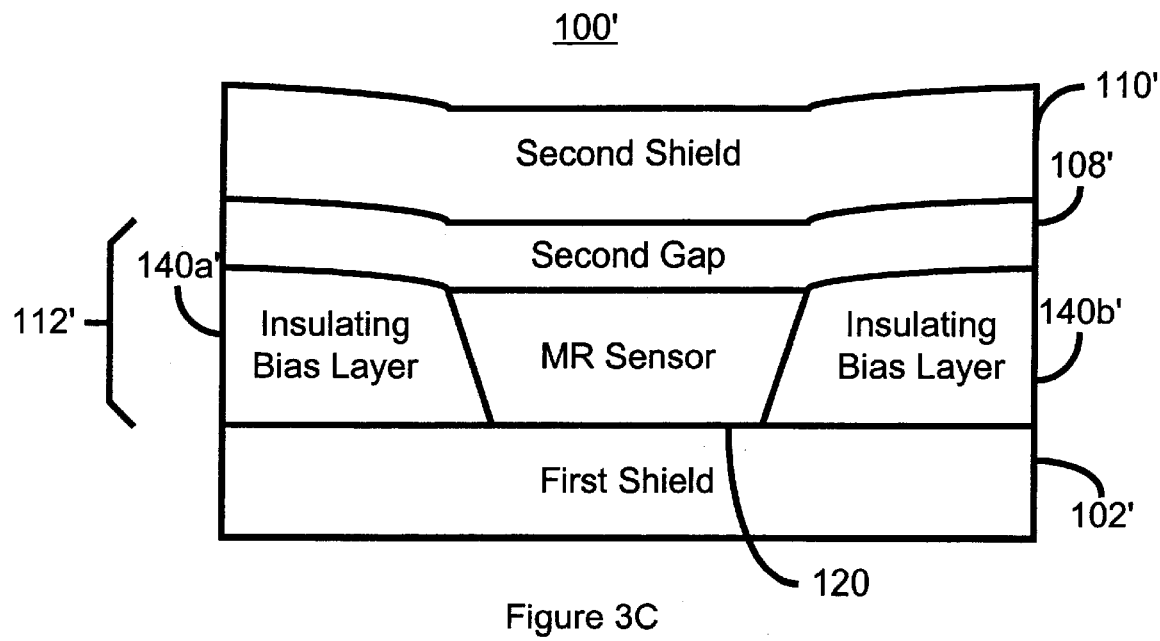
FIG. 3C is a diagram of a portion of another embodiment of the magnetoresistive head in accordance with the present invention as viewed from the air-bearing surface.

The MR head 100 depicted in FIG. 3B is a contiguous junction head. In other words, the MR sensor 120 of the MR head 100 is provided prior to the insulating bias layers 140a and 140b. FIG. 3C depicts another embodiment of the MR head 100' in accordance with the present invention as viewed from the ABS. As viewed from the side, the MR head 100' is substantially the same as the MR head 100 depicted in FIG. 3A. Thus, the MR head 100' of FIG. 3C is substantially the same as the MR head 100. The MR head 100' would also include a lead 106' (not shown) and a first gap 104' (not shown). However, the MR head 100' has an inverted configuration. In such a configuration, the insulating bias layers 140a' and 140b' are provided prior to the MR sensor 120. The first shield 102', the second gap 108', the second shield 110' and the remaining portions of the MR head 100' (not depicted in FIG. 3C) are the same as for the MR head 100. Because the MR head 100 and 100' have insulating bias layers 140a, 140b, 140a' and 140b" the MR heads 100 and 100' have the same advantages. Thus, the drawbacks due to domains and domain wall motion in at least a portion of the MR sensor 120 can be reduced or eliminated. This is accomplished without shunting a substantial portion of the current away from the MR sensor 120 in the MR head 100 and the MR head 100'. In addition, because at least one recessed shield may be used, the flux decay length of the MR sensor 120 is increased in the MR heads 100 and 100'. Thus, a greater portion of the MR sensor 120 may be exposed to magnetic flux from the recording media 101 and thus generate a signal. Consequently, in addition to having reduced noise and other drawbacks due to multiple domains, the MR heads 100 and 100' may be suitable for higher density recording applications. Furthermore, shorting of the MR sensor 120 to the first shield 102' improves the resistance of the MR sensor 120 to destruction because of ESD.

Figure 4A:
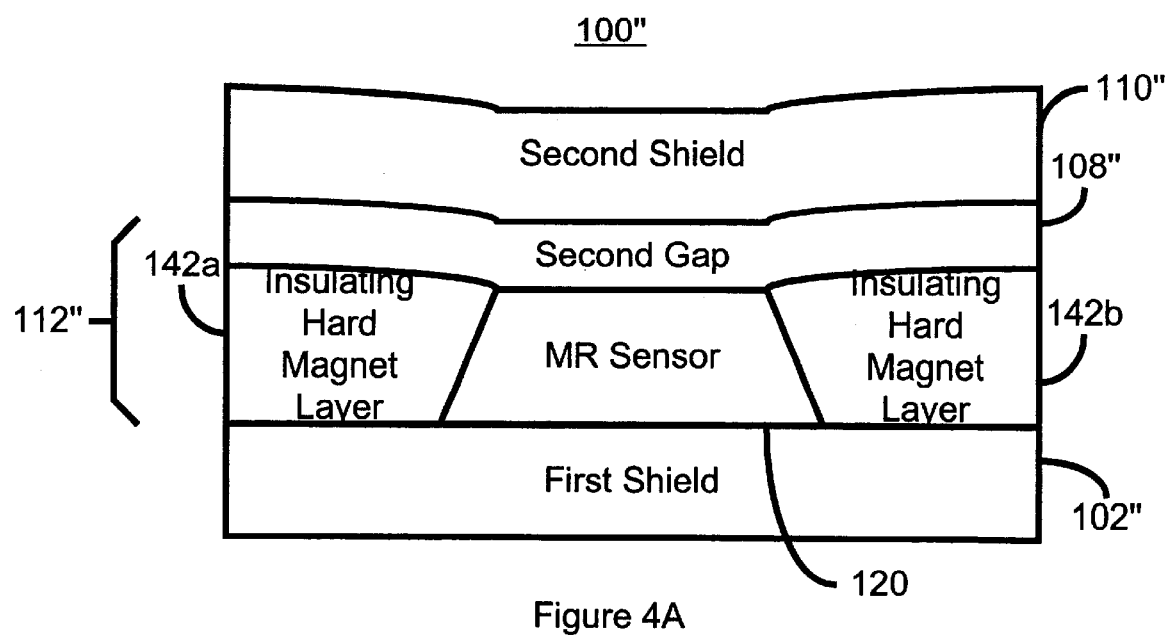
FIG. 4A is a diagram of a portion of an embodiment of the magnetoresistive head in accordance with the present invention as viewed from the air-bearing surface.
Figure 4B:
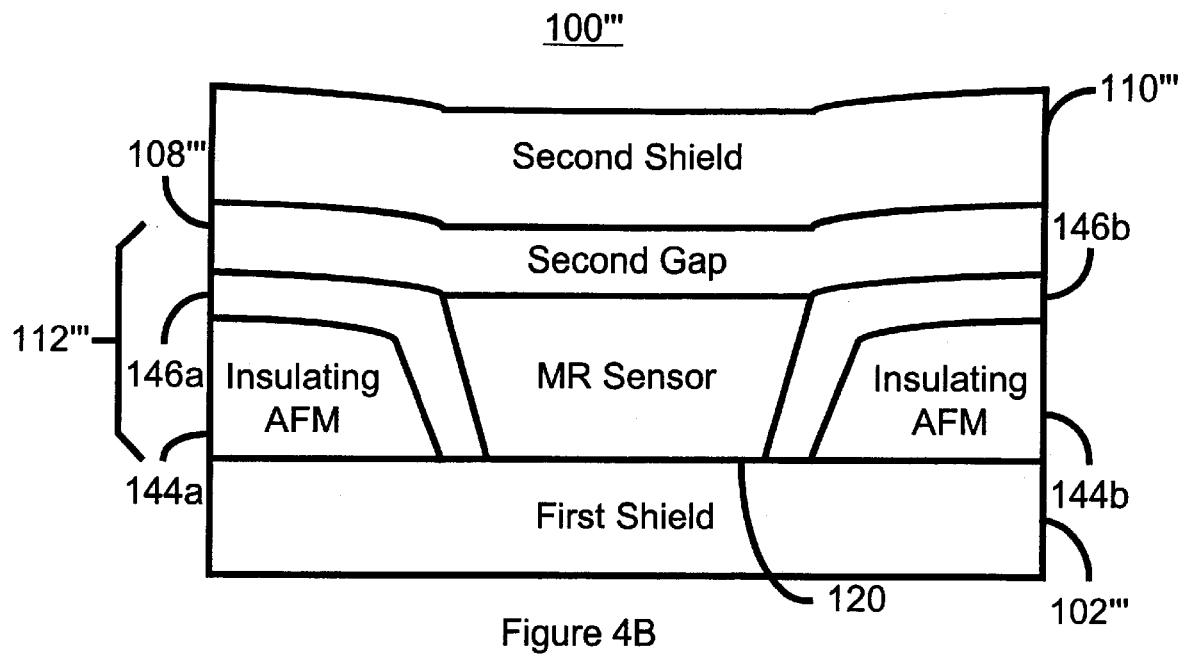
FIG. 4B is a diagram of a portion of another embodiment of the magnetoresistive head in accordance with the present invention as viewed from the air-bearing surface.

FIGS. 4A and 4B depict embodiments of the MR head 100" and 100'" which use different insulating bias layers. FIG. 4A depicts the MR head 100" from the ABS. As viewed from the side, the MR head 100" is substantially the same as the MR head 100 depicted in FIG. 3A. Referring back to FIG. 4A, the MR head 100" includes a first shield 102", a second gap 108", the MR sensor 120, and a second shield 110". The MR head 100" would also include a lead 106" (not shown) and a first gap 104" (not shown). Thus, current would be driven through the MR head 100" vertically, perpendicular to the ABS. The MR head 100" includes insulating hard magnetic layers 142a and 142b for use as insulating bias layers. The insulating hard bias layers 142a and 142b preferably include materials such as ferrites. For example, the insulating hard magnetic layers 142a and 142b could include one or more of cobalt ferrite, which typically has a coercivity on the order of three kOe or more, barium ferrite, and strontium ferrite. However, other insulating hard magnets may be used. The coercivities of such materials should be greater than the fields to which the MR head 100" will be exposed during operation. For example, the coercivities of the hard magnetic layers 142a and 142b may be on the order of several hundred Oe or more. Thus, the magnetizations of hard magnetic layers 142a and 142b will remain stable, allowing the hard magnetic layers 142a and 142b to magnetically bias at least a portion of the MR sensor 120. In a preferred embodiment, the insulating hard magnetic layers 142a and 142b magnetically bias the free layer of the MR sensor 120. This magnetic biasing reduces problems due to multiple domains in the free layer of the MR sensor 120. Thus, the performance of the MR sensor 120 can be improved. In addition, because the hard magnetic layers 142a and 142b are insulating, they will shunt little or no current away from the MR sensor 120.

FIG. 4B depicts the MR head 100''' from the ABS. As viewed from the side, the MR head 100''' is substantially the same as the MR head 100 depicted in FIG. 3A. Referring back to FIG. 4B, the MR head 100''' includes a first shield 102''', a second gap 108''', the MR sensor 120, and a second shield 110'''. The MR head 100''' would also include a lead 106''' (not shown) and a first gap 104''' (not shown). Thus, current would be driven through the MR head 100''' vertically, perpendicular to the ABS. The MR head 100''' includes insulating AFM layers 144a and 144b and insulating soft magnetic layers 146a and 146b. The insulating AFM layers 144a and 144b may include materials such as cobalt oxide and/or nickel oxide. However, other insulating AFM materials may be used. The insulating soft magnetic layers 146a and 146b may include materials such as nickel ferrite and zinc ferrite. The coercivity of the soft magnetic layers 146a and 146b should be relatively small, less then approximately one hundred Oe and preferably on the order of tens of Oe or less.

Because of the exchange interaction between the insulating AFM layers 144a and 144b and the insulating soft magnetic layers 146a and 146b, respectively, the magnetizations of the insulating soft magnetic layers 146a and 146b are pinned. Thus, the magnetizations of insulating soft magnetic layers 146a and 146b will remain stable during operation of the MR head 100'''. As a result, the soft magnetic layers 146a and 146b can magnetically bias at least a portion of the MR sensor 120, thereby improving the performance of the MR sensor 100'. In a preferred embodiment, the insulating soft magnetic layers 146a and 146b magnetically bias the free layer of the MR sensor 120. This magnetic biasing reduces problems due to multiple domains in the free layer of the MR sensor 120. In addition, because the soft magnetic layers 146a and 146b and the AFM layers 144a and 144b are insulating, they will shunt little or no current away from the MR sensor 120.

Figure 5:
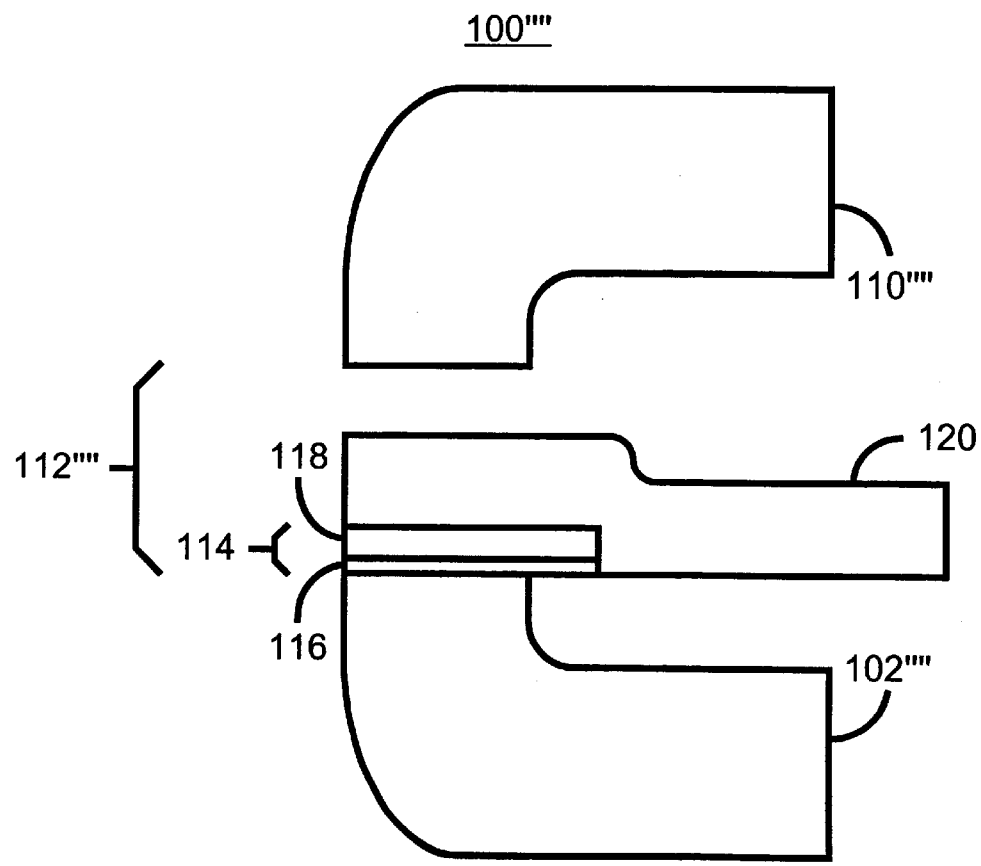
FIG. 5 is a side view of a portion of one embodiment of the magnetoresistive head in accordance with the present invention.

FIG. 5 is a more detailed diagram of a portion of one embodiment of the MR head 100''''. A portion of the first shield 102'''', the second shield 110'''', the MR sensor 120 and the read gap 112'''' are depicted. Also shown is a second lead 114, which may be used to electrically couple the MR sensor 120 to the first shield 102''''. In a preferred embodiment, the second lead 114 is a laminated structure. The preferred embodiment of the second lead 114 includes a nonmagnetic layer 118 and a magnetic layer 116. The nonmagnetic layer 118 preferably includes a nonmagnetic metal such as tantalum. In one embodiment, the nonmagnetic layer 118 is approximately ten nanometers thick. The magnetic layer 116 preferably includes a magnetic metal such as permalloy. Also in a preferred embodiment the magnetic layer 116 is thicker than the nonmagnetic layer 118. The nonmagnetic layer 118 is used to help break any exchange coupling between the first shield 102 and the MR sensor 120. Consequently, the MR sensor 120 can respond to an external magnetic field. The magnetic layer 116 aids in reducing the reluctance of the MR sensor 120 in the read throat region, thereby increasing signal amplitude for the MR head 100''''.

Figure 6A:
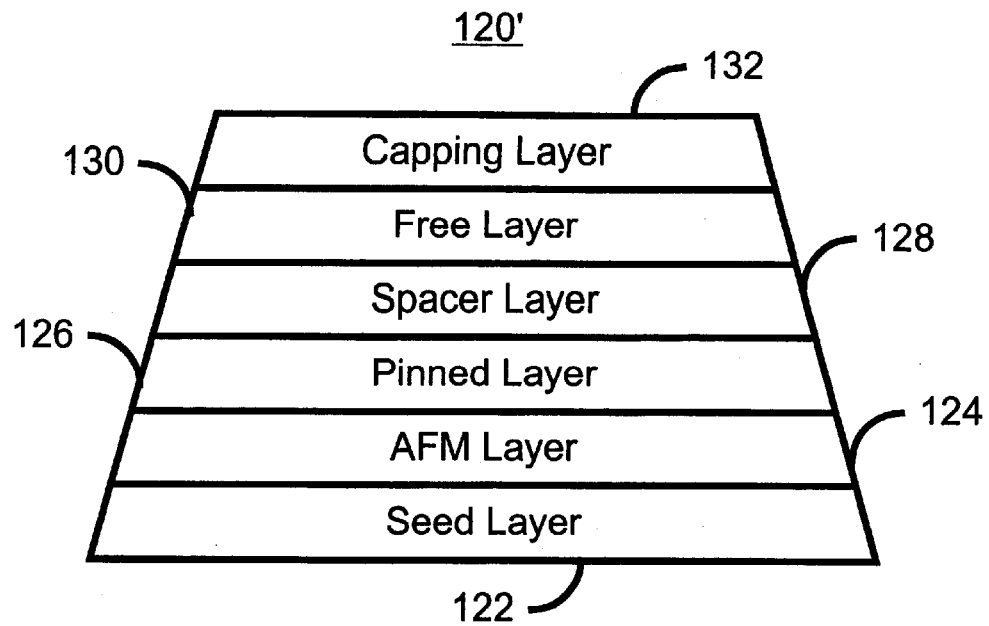
FIG. 6A is a diagram of one embodiment of the magnetoresistive sensor in accordance with the present invention.
Figure 6B:
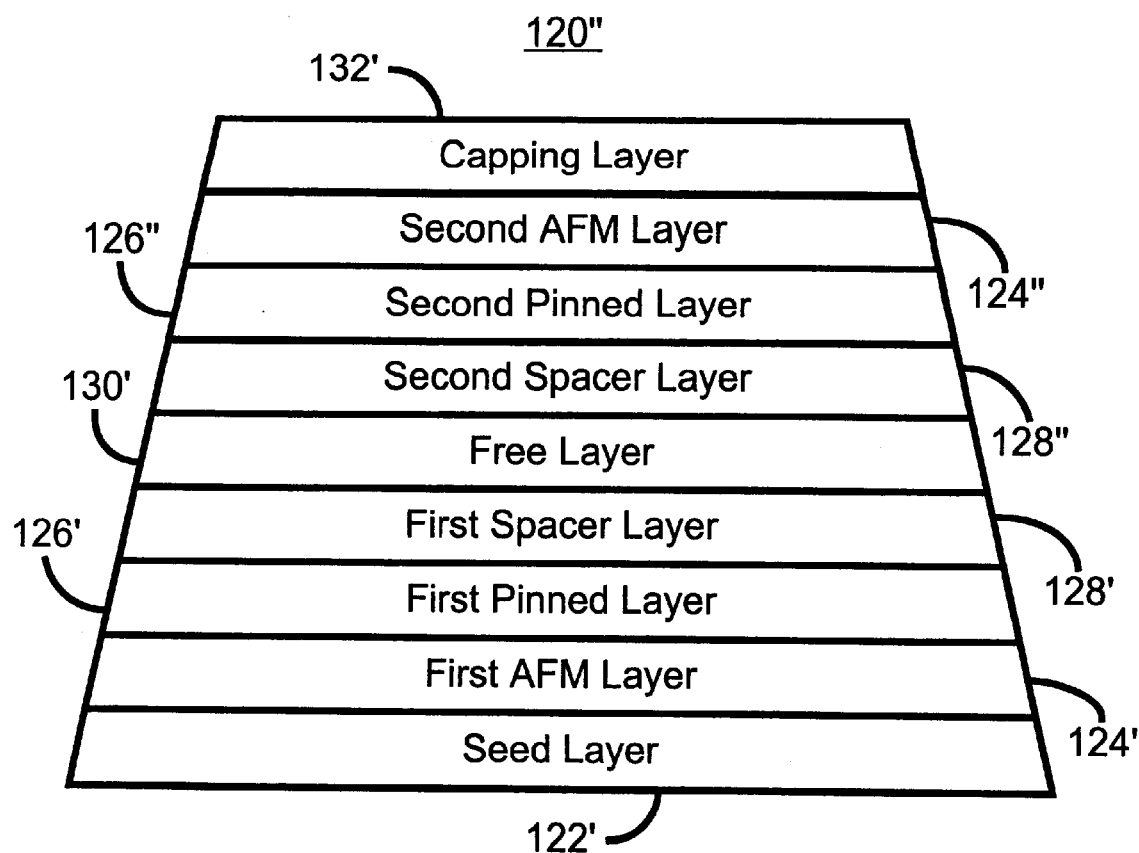
FIG. 6B is a diagram of another embodiment of the magnetoresistive sensor in accordance with the present invention.

FIGS. 6A and 6B depict two embodiments of the MR sensor 120' and 120". The MR sensors 120' and 120" may be used in the MR heads 100, 100', 100'', 100''' and 100''''. The MR sensors 120' and 120" depict single and dual spin valves, respectively. However, nothing prevents the use of another MR sensor. For example, FIG. 6A depicts a bottom spin valve in which the free layer is near the top of the MR sensor 120'. However, nothing prevents the use of a bottom spin valve (not shown), in which the free layer is near the bottom of the MR sensor and the order of the layers is reversed, or the use of another MR sensor. The MR sensor 120' includes an optional seed layer 122, a pinning layer that is typically an AFM layer 124, a pinned layer 126, a nonmagnetic spacer layer 128, a free layer 130 and an optional capping layer 132. The pinned layer 126 and the free layer 130 are ferromagnetic. The magnetization of the pinned layer 126 is pinned by the AFM layer 124. The AFM layer 124 is preferably on the order of approximately one hundred Angstroms in thickness. While the current trend in the art is to reduce the thickness of the AFM layer 124 to about one hundred Angstroms, the configuration of the MR sensor 120' permits the use of thicker AFM layers 124, especially when the AFM layers 124 serve as the electrical coupling between the lead and the remainder of the MR sensor 120'. In one embodiment, the AFM layer 124 may serve to electrically couple the MR sensor 120' to the first shield. In such a case, the second lead 114 of FIG. 5 may be omitted. Referring back to FIG. 6A, the magnetization of the free layer 130 is free to rotate in response to an external magnetic field. Based on the difference in direction of magnetizations of the free layer 130 and the pinned layer 126, the MR sensor 120' can read data stored in a recording media.

FIG. 6B depicts another embodiment of the MR sensor 120". The MR sensor 120" preferably includes a seed layer 122' and a capping layer 132'. The MR sensor 120' includes a first pinning or AFM layer 124', a first pinned layer 126', a first spacer layer 128', a free layer 130', a second spacer layer 128", a second pinned layer 126" and a second pinning or AFM layer 122". The AFM layers 124' and 124" are preferably thick, on the order of three hundred to four hundred Angstroms in thickness. In one embodiment, the AFM layer 124' may server to electrically couple the MR sensor 120" to the first shield. In such a case, the second lead 114, depicted in FIG. 5, may be omitted. Referring back to FIG. 6B, the MR sensor 120" is thus a dual spin valve. The first and second pinned layers 126' and 126" function similarly to the pinned layer 126 of the MR sensor 120'. The free layer 130' functions similarly to the free layer 130 of the MR sensor 120'. Thus, the difference in directions of the magnetizations of the free layer 130' and the pinned layers 126' and 126" allows the MR sensor 120" to read data stored in recording media.

Figure 7A:
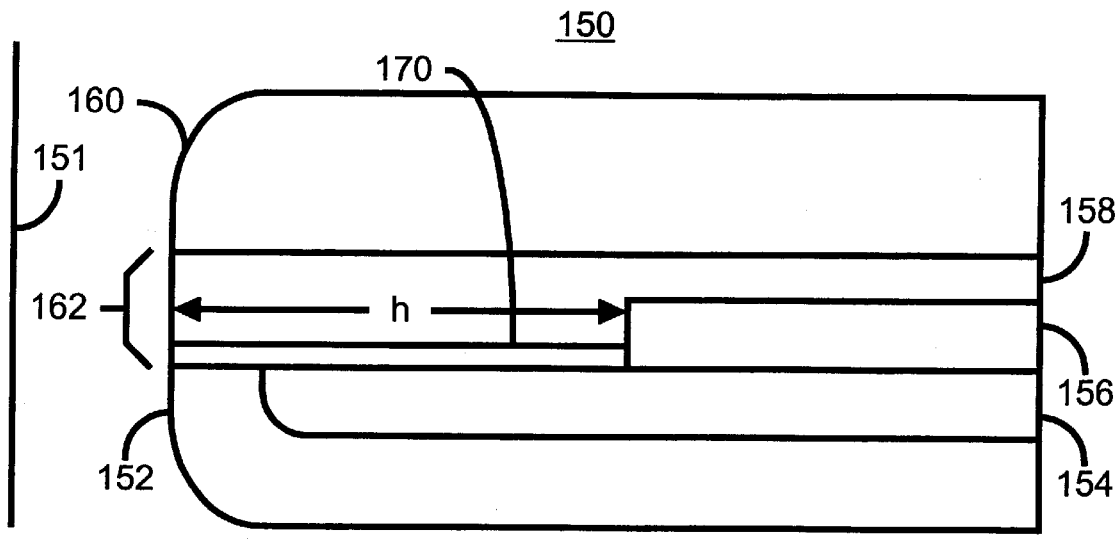
FIG. 7A is a diagram of a second configuration of a magnetoresistive head in accordance with the present invention.
Figure 7B:
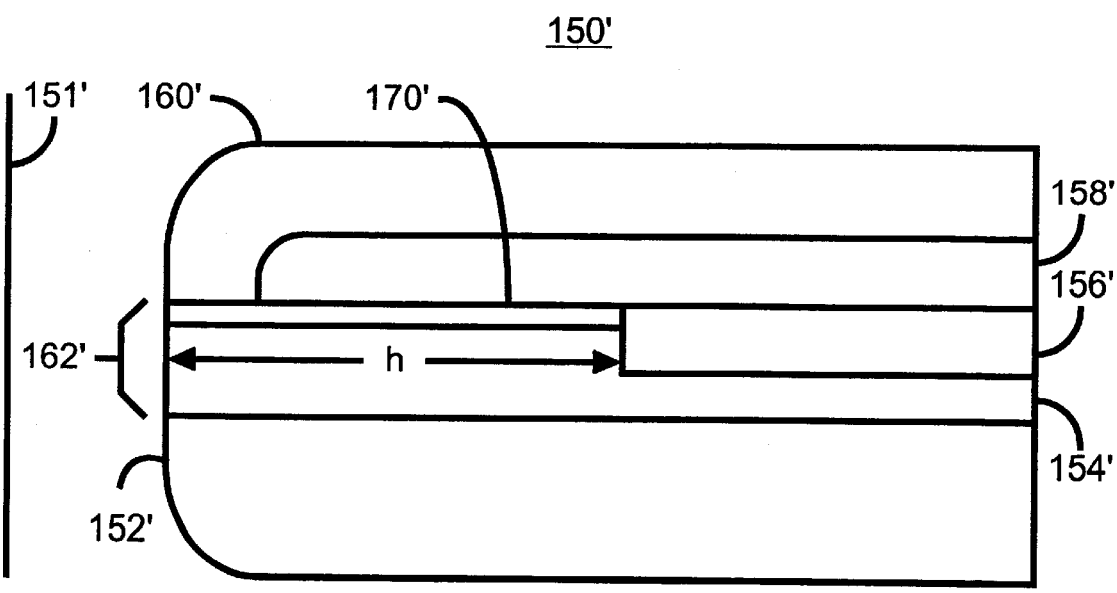
FIG. 7B is a diagram of a third configuration of a magnetoresistive head in accordance with the present invention.
Figure 7C:
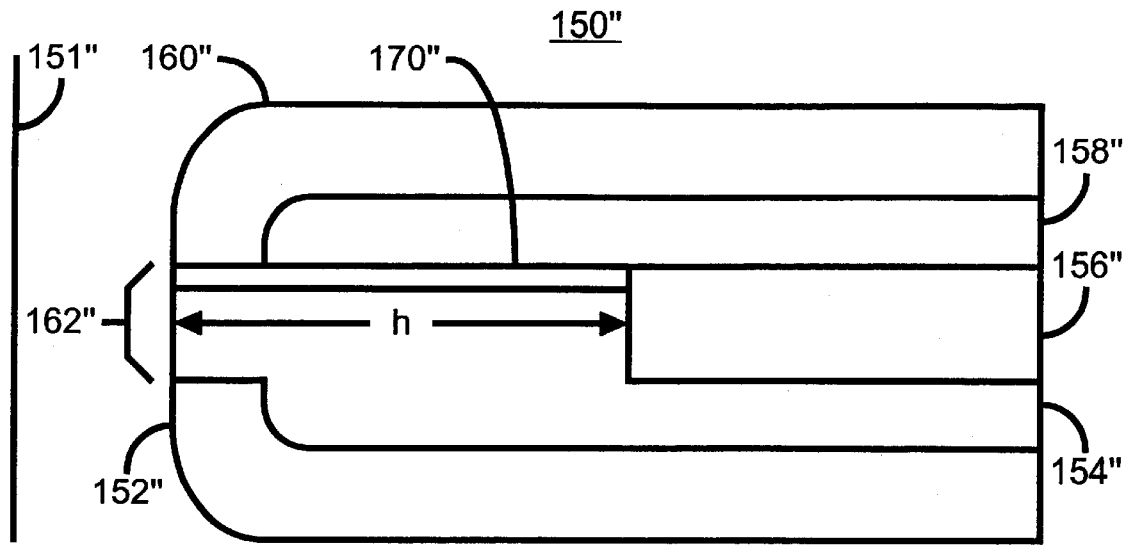
FIG. 7C is a diagram of a fourth configuration of a magnetoresistive head in accordance with the present invention.

FIGS. 7A–7C depict side views of some alternate embodiments of the MR heads 150, 150' and 150", respectively, in accordance with the present invention. Although not depicted in FIGS. 7A–7C, the MR heads 150, 150' and 150" would include insulating bias layers such as the layers 140a and 140b, the layers 142a and 142b, and the combination of the layers 144a, 144b, 146a and 146b. Thus, the MR heads 150, 150' and 150" can have improved performance due to magnetic biasing of the corresponding MR sensors. Thus, many of the same benefits of the MR heads 100, 100', 100" and 100'" can be achieved in the MR heads 150, 150' and 150". The MR heads 150, 150' and 150" depict some alternate configurations for the first and second shields.

FIG. 7A depicts an alternate embodiment of the invention in a MR head 150 in accordance with the present invention. The MR head 150 is substantially the same as the MR heads 100, 100', 100" and 100'" depicted in FIGS. 3A–5. Referring back to FIG. 7A, the MR head 150 thus includes a first shield 152, a MR sensor 170, a second shield 160, a lead 156, a read gap 162, a first gap 154 and a second gap 158. The first shield 152, the MR sensor 170, the second shield 160, the lead 156, the read gap 162, the first gap 154 and the second gap 158 correspond to the first shield 102, the MR sensor 120, the second shield 110, the lead 106, the read gap 112, the first gap 104 and the second gap 108, respectively. The MR sensor 170 may also be shorted to the first shield 152 using a lead substantially the same as the second lead 114 shown in FIG. 5. Although the central portions of the second shield 160 and the first shield 152 are separated by a greater distance than at the read gap 160, the central portion of the second shield 160 is not recessed. Consequently, the flux decay length for the MR head 150 may be less than that of the MR head 100 or 100'. However, because at least the first shield 152 is recessed, the flux decay length for the MR head 150 is still longer than for a conventional MR head 10 or 50. Thus, in addition to magnetically biasing at least a portion of the MR sensor 170 and driving current vertically, the MR head 150 also has a longer flux decay length for the MR sensor 170, allowing the MR sensor 170 to provide a larger signal. Consequently, the MR head 150 has substantially the same advantages as the MR heads 100, 100', 100" and 100'".

FIG. 7B depicts a third embodiment of the MR head 150' in accordance with the present invention. The MR head 150' is substantially the same as the MR heads 100, 100', 100" and 100'" shown in FIGS. 3A–5. Referring back to FIG. 7B, the MR head 150'includes a first shield 152', a MR sensor 170', a second shield 160', a lead 156', a read gap 162', a first gap 154' and a second gap 158'. The first shield 152', the NR sensor 170', the second shield 160', the lead 156', the read gap 162', the first gap 154' and the second gap 158' correspond to the first shield 102, the MR sensor 120, the second shield 110, the lead 106, the read gap 112, the first gap 104 and the second gap 108, respectively. Furthermore, the MR sensor 170' is shorted to the second shield 160' rather than the first shield 152'. The MR sensor 170' may also be shorted to the second shield 160' using a lead substantially the same as the second lead 114 shown in FIG. 5. However, the shield to which the MR sensor 170' is shorted should not greatly affect the functioning of the MR head 170'. Although the central portion of the first shield 152' is not recessed, the central portion of the second shield 152' is recessed. Thus, the central portions of the second shield 160' and the first shield 152' are separated by a greater distance than at the read gap 162'. The flux decay length for the MR head 150' may be less than that of the MR heads 100 and 100'. However, because at least the second shield 160' is recessed, the flux decay length for the MR head 150' is still longer than for the conventional MR head 10 or 50. Thus, in addition to magnetically biasing at least a portion of the MR sensor 170' and driving current vertically, the MR head 150' also has a longer flux decay length for the MR sensor 170', allowing the MR sensor 170' to provide a larger signal. Consequently, the MR head 150' has substantially the same advantages as the MR heads 100, 100', 100" and 100'".

FIG. 7C depicts a fourth embodiment of the invention in a MR head 150" in accordance with the present invention. The MR head 150" is substantially the same as the MR heads 100, 100', 100" and 100'" shown in FIGS. 3A–5. Referring back to FIG. 7C, the MR head 150" includes a first shield 152", a MR sensor 170", a second shield 160", a lead 156", a read gap 162", a first gap 154" and a second gap 158". The first shield 152", the MR sensor 170", the second shield 160", the lead 156", the read gap 162", the first gap 154" and the second gap 158" correspond to the first shield 102, the MR sensor 120, the second shield 110, the lead 106, the read gap 112, the first gap 104 and the second gap 108, respectively. Furthermore, the MR sensor 170" is shorted to the second shield 160" rather than the first shield 152". The MR sensor 170" may be shorted to the second shield 160" using a lead substantially the same as the second lead 114 shown in FIG. 5. However, the shield to which the MR sensor 170" is shorted should not greatly affect the functioning of the MR head 170". Because the first shield 152" and the second shield 160" are recessed, the flux decay length for the MR head 150" is longer than for the conventional MR head 10 or 50. Thus, in addition to magnetically biasing at least a portion of the MR sensor 170" and driving current vertically, the MR head 150" also has a longer flux decay length for the MR sensor 170", allowing the MR sensor 170" to provide a larger signal. Consequently, the MR head 150" has substantially the same advantages as the MR heads 100, 100', 100" and 100'".

Figure 8:
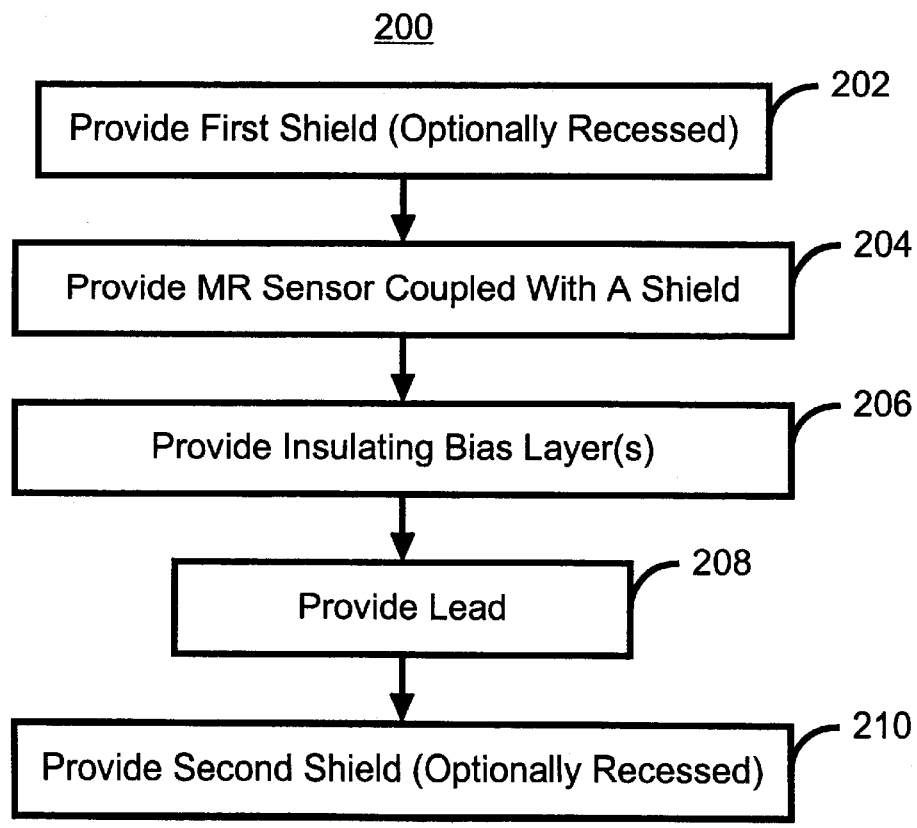
FIG. 8 is a flow chart depicting one embodiment of a method for providing a magnetoresistive head in accordance with the present invention.

FIG. 8 depicts one embodiment of a method 200 for providing the MR head 100, 100', 100", 100'", 150, 150', and 150" in accordance with the present invention. The first shield, optionally recessed, is provided, via step 202. For example, if the MR head 100, 100', 100", 100'", 150, or 150" is being provided, then the first shield is recessed. The MR sensor, coupled with one of the shields, is then provided, via step 204. Thus, step 204 may include providing the first gap between the shield and at least a portion of the MR sensor. Step 204 also includes providing the desired type of MR sensor, such as a spin valve, a synthetic spin valve, a dual spin valve or a spin filter. Furthermore, step 204 should control the endpoint of the MR sensor. Because the MR sensor is coupled with one of the shields, a portion of the MR sensor will generally be dead. In particular, the portion of the MR sensor that is physically coupled with the shield may not contribute to the magnetoresistance due to current shunting in the connected shield and leads, if any. Furthermore, the flux decay length is measured starting at the very edge of the shield. Consequently, an otherwise useful portion of the MR sensor is lost. Thus, the portion of the MR sensor that is physically coupled to the shield is preferably reduced, while maintaining a good electrical contact to the shield in step 204. Preferably, the portion of the MR sensor that is physically coupled to the shield is desired to be one to two micro-inches or less. Furthermore, in a merged head, the zero throat position of the write head should be aligned to the junction of the shield and the MR sensor to reduce the dead region to a minimum in the reader. This would, of course, also require careful control of the end point of the slider/bar lapping/machining process. Thus, the endpoint of the MR sensor should be well controlled in step 204.

The insulating bias layers are provided in step 206. If the MR head being fabricated is a contiguous junction, then the insulating bias layers provided in step 206 after the MR sensor is provided in step 204. Otherwise, the insulating bias layers may be provided before the MR sensor.

A lead coupled to the back end of the MR sensor is provided, via step 208. The second shield, optionally recessed, is then provided, via step 210. Step 210 may also include providing at least a portion of the second read gap. For example, if the MR head 100, 100", 100'", 100"", 150' or 150" is being provided, then the second shield is recessed. Thus, the combination of steps 202 and 210 ensure that the shields are separated by a larger distance at their central portions than at the read gap. Fabrication of the MR head may then be completed. In addition, a portion of the head used for writing is provided if a merged head is being formed. In addition, the MR sensor may be lapped to ensure that the stripe height of the MR sensor is of the desired length.

Figure 9:
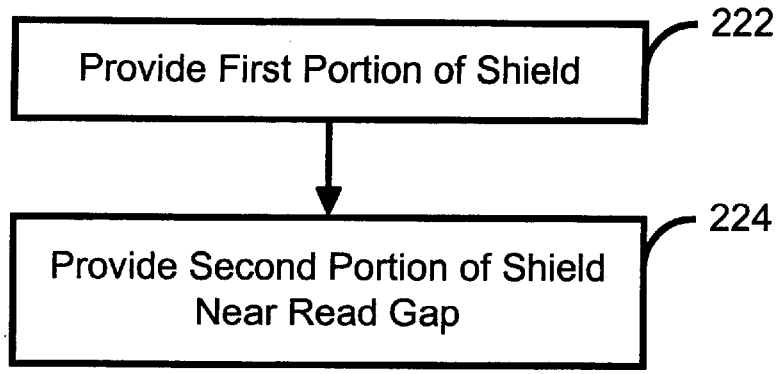
FIG. 9 is a flow chart depicting one embodiment of a method for providing a recessed shield in accordance with the present invention.

FIG. 9 depicts one embodiment of a method 202' or 210' for providing a recessed shield, such as the shield 102 depicted in FIG. 3A. Referring back to FIG. 9, the longer, central portion of the shield is deposited, via step 222. A second portion of the shield near the read gap is provided, via step 224. The second portion of the shield may be provided by masking the MR head so that the portion near the read gap is exposed, then depositing the second portion of the pole. The second portion of the shield may also be provided by etching a portion of the shield provided in step 222 or depositing and etching an additional layer. If the recessed shield is the first shield, then step 222 may be provided before step 224. If the recessed shield is the second shield, then step 224 may be performed prior to step 222.

Figure 10A:
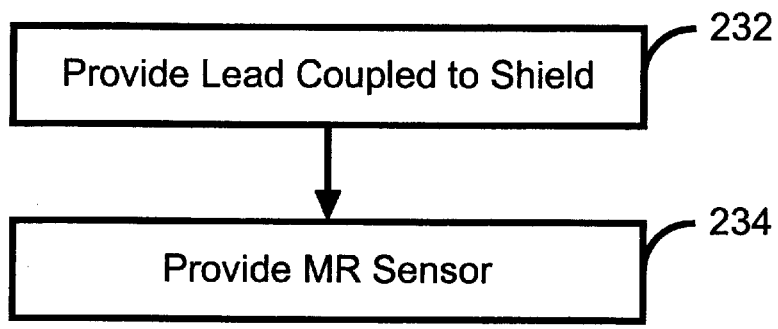
FIG. 10A is a flow chart depicting one embodiment of a method for providing the magnetoresistive sensor in accordance with the present invention.

FIG. 10A depicts one embodiment of step 204', providing the MR sensor. The lead is provided, via step 232. The MR sensor is provided, via step 234. If the MR sensor is shorted to the first shield, then step 232 is provided prior to step 234. If, however, the MR sensor is shorted to the second shield, then step 234 is provided prior to step 232. Thus, the MR sensor coupled with one of the shields is provided.

Figure 10B:
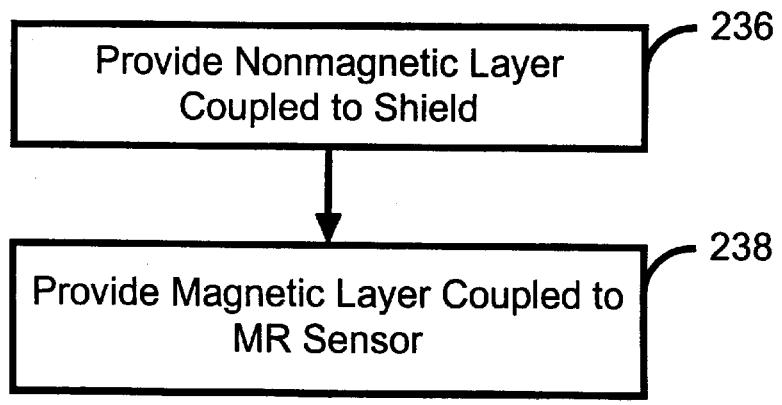
FIG. 10B is a flow chart depicting one embodiment of a method for providing the magnetoresistive sensor in accordance with the present invention.

FIG. 10B depicts one embodiment of a method for providing the lead in step 232'. A nonmagnetic layer coupled with the appropriate shield is provided, via step 236. A magnetic layer coupled with the MR sensor is provided, via step 238. If the lead couples the MR sensor to the first shield, then step 236 is preferably provided prior to step 238. If the lead couples the MR sensor to the second shield, then step 238 is preferably provided prior to step 236.

Figure 11A:
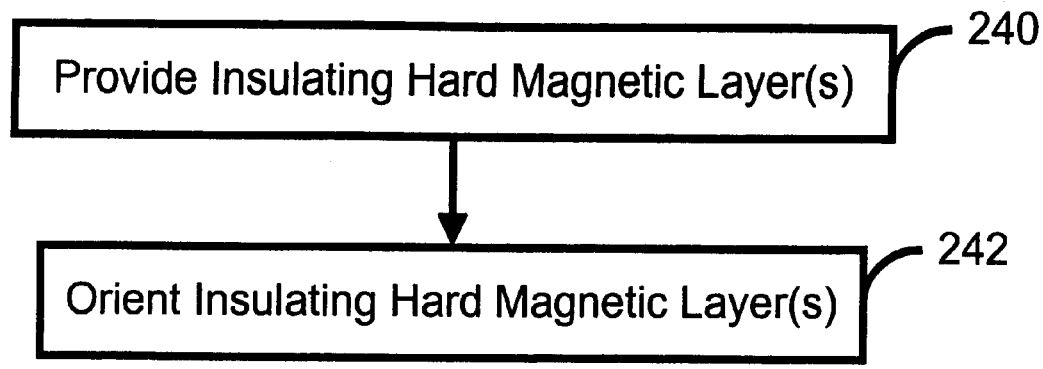
FIG. 11A is a flow chart depicting one embodiment of a method for providing the insulating bias layer in accordance with the present invention.
Figure 11B:
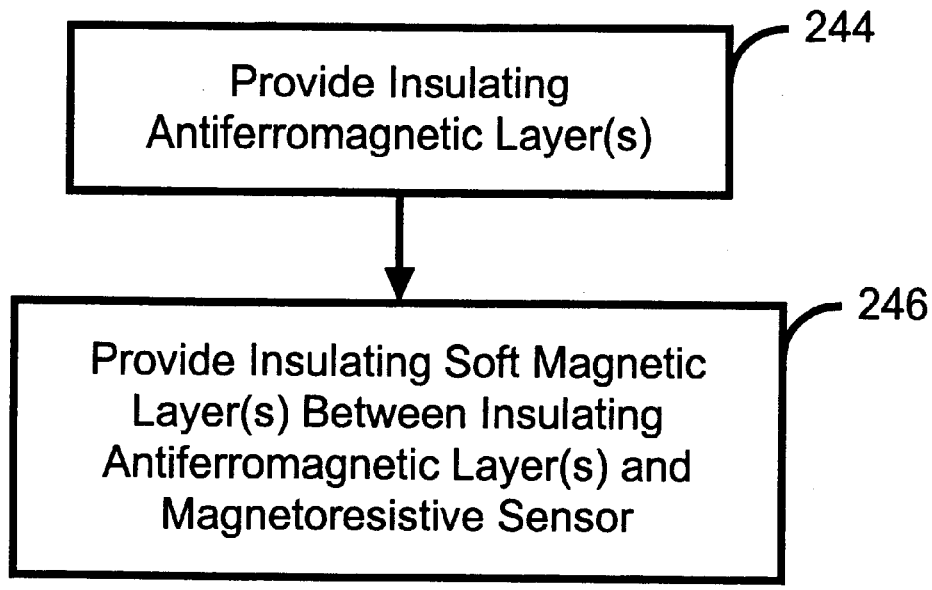
FIG. 11B is a flow chart depicting one embodiment of a method for providing the insulating bias layer in accordance with the present invention.

FIGS. 11A and 11B depict embodiments of methods 206' and 206" for providing the insulating bias layers for the MR heads 100, 100', 100", 100'", 150, 150' and 150". FIG. 11A is a flow chart depicting one embodiment of a method 206' for providing the insulating bias layer in accordance with the present invention. The method 206' is preferably used for providing the insulating hard bias layers 142a and 142b in the MR head 100". The insulating hard bias layers are deposited, via step 240. If the MR head 100" has a contiguous junction configuration, then step 240 would be performed after the MR sensor has been provided. Otherwise, step 240 may be performed before the MR sensor is provided. The orientations of the magnetizations of the insulating hard bias layers can then be set, via step 242. The orientations are preferably set to be longitudinal, in the plane of the page and along the cross-track direction when the head is flying over the recorded track on the media. Referring back to FIG. 11A, in one embodiment, step 242 can be performed by applying a very high magnetic field, for example approximately ten kOe, to the hard bias layers at room temperature.

FIG. 11B is a flow chart depicting another embodiment of a method 206" for providing the insulating bias layer in accordance with the present invention. The method 206" may be used when providing the MR head 100'" depicted in FIG. 4B. Referring back to FIG. 11B, the insulating AFM layers are provided, via step 244. The insulating soft magnetic layers are then provided such that the insulating soft magnetic layers will be between the insulating AFM layers and the MR sensor, via step 246. The orientations of the insulating soft magnetic layers are preferably longitudinal and are determined by the is coupling between the AFM layers and the soft magnetic layers. Thus, the methods 206' or 206" provide insulating bias layers which are either hard magnets or a combination of insulating AFM layers and insulating soft magnetic layers. These insulating bias layers can then bias the free layers of the MR sensors 120, 120', 120", 170, 170' and 170" to improve the performance of the MR sensors 120, 120', 170, 170' and 170".

Figure 12:
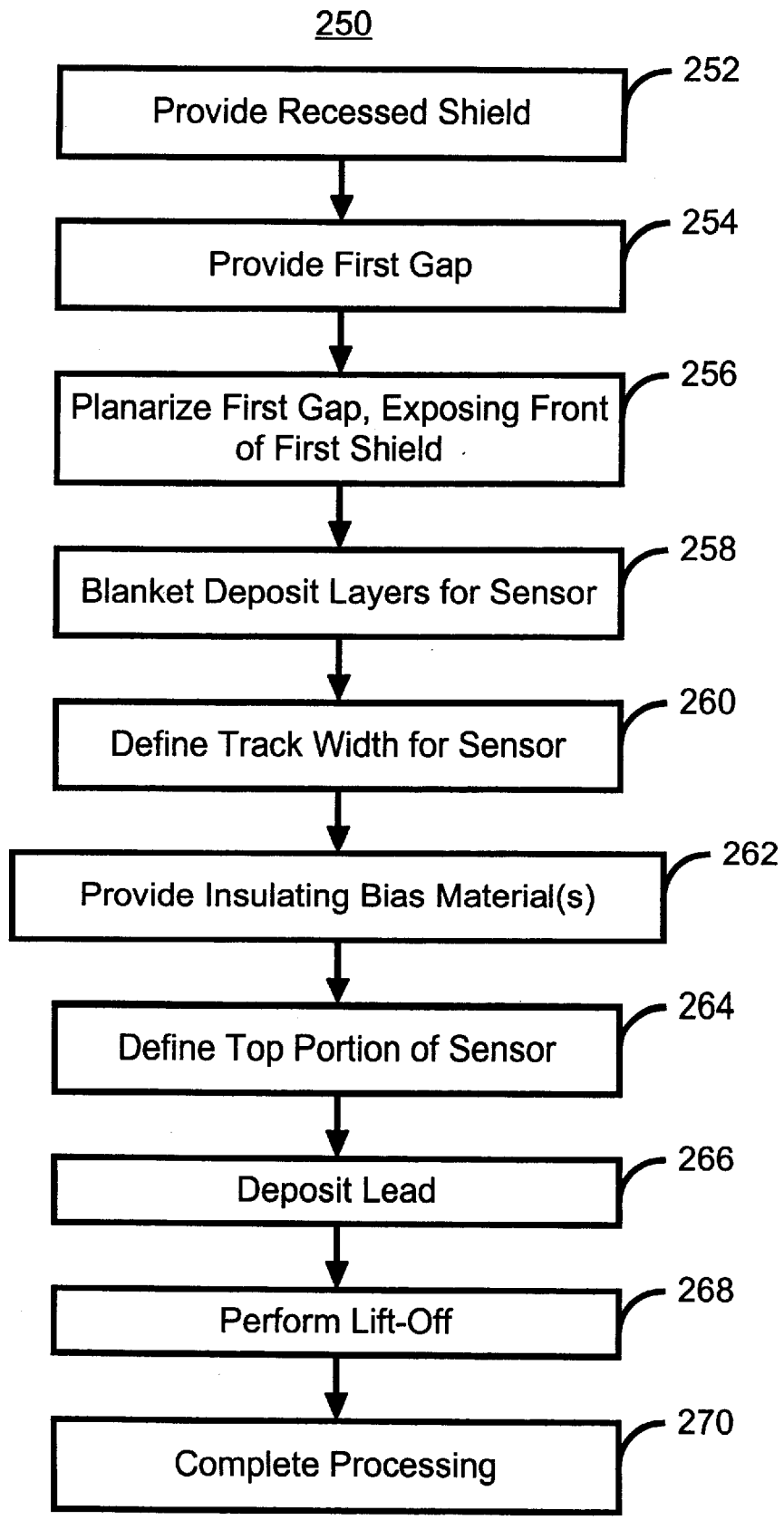
FIG. 12 is a more detailed flow chart depicting a one embodiment of a method for providing a recessed shield in accordance with the present invention.

FIG. 12 depicts a more detailed flow chart of one embodiment of a method 250 for providing the MR heads 100, 100', 100", 100'", 100"", 150, 150' and 150". For clarity, the method 250 will be described using the MR head 100 depicted in FIGS. 3A–3B. However, nothing prevents the method 250 from being adapted to providing other MR heads. Referring to FIGS. 3A, 3B and 12, a recessed first shield 102 is provided, via step 252. In particular, the method 202'/210' depicted in FIG. 9 may be used to ensure that the portion of the first shield 102 near the read gap 112 is raised with respect to the central portion of the first shield 102. Referring back to FIGS. 3A, 3B and 12, the first gap 104 is then provided, via step 254. Step 254 is preferably performed by blanket depositing an insulator, such as alumina. The first gap is planarized, via step 256. Thus, the portion of the first shield 102 near the read gap 112 is exposed in step 256.

The layers for the MR sensor 120 are blanket deposited, via step 258. Thus, the MR head 100 being performed preferably has a contiguous junction configuration. The bottom layer of the MR sensor 120 is preferably an AFM layer, which may be formed on a seed layer. Thus, the MR sensor 120 is preferably a bottom or dual spin valve. The track width for the MR sensor 120 is then defined, via step 260. Step 260 typically includes providing a bi-layer photoresist structure and etching the exposed portion of the layers deposited in step 258. The insulating bias material(s) are deposited, via step 262. Preferably, step 262 is self-aligned, being performed while the bi-layer photoresist structure remains in place.

The top portion of the MR sensor 120 is defined, via step 264. Step 264 is preferably performed providing a photoresist structure on the MR sensor 120 which exposes a portion of the MR sensor that is to be removed. The exposed portion of the MR sensor 120 is preferably removed in the lift-off processes discussed below. The lead 106 is deposited, via step 266. Thus, the lead 106 is electrically coupled to the MR sensor 120. Step 266 is preferably performed with the photoresist structure used in step 264 in place. Thus, step 266 preferably results in a self-aligned lead 106. Lift-off processes are then performed, via step 268. The lift-off processes performed in step 268 remove the photoresist structures, extraneous insulating bias material, extraneous lead material and extraneous portions of the MR sensor 120.

The processing of the MR head 100 is then completed, via step 270. Step 270 thus includes providing the second gap 108 and the optionally recessed second shield 110. In addition, the final stripe height is determined in step 206, preferably by lapping the MR sensor 120. Step 270 may also include providing other portions of the head. For example, if the MR head 100 is part of a merged head, the remaining portions of the merged head may be provided in step 270. In addition, in a merged head, the second shield 110 may double as the first pole for the portion of the merged head used in writing data to the recording media 101.

A method and system has been disclosed for providing a MR head that can operate at higher track densities because the bias current is driven vertically, perpendicular to the ABS. The MR head can magnetically bias the free layer of the MR sensor while shunting little or no current away from the MR sensor. Furthermore, the MR sensor may have an improved signal due to a longer flux decay length that results from the use of at least one recessed shield. In addition, the MR head may protect the MR sensor against ESD because the MR sensor is electrically coupled to one of the shields. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive head for reading data from a recording media comprising:
    a first shield having a first end, a central portion and a second end, the first end being closer to the recording media during use than the second end;
    a second shield having a first end, a central portion, and a second end, the first end of the second shield being closer to the recording media during use than the second end of the second shield;
    a magnetoresistive sensor disposed between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;
    at least one insulating bias layer magnetically coupled to the magnetoresistive sensor, the at least one insulating bias layer for magnetically biasing at least a portion of the magnetoresistive sensor; and
    a lead electrically coupled with the back end of the magnetoresistive sensor;
    wherein current is driven through the magnetoresistive sensor in a direction substantially perpendicular to the recording media during use; and
    wherein the front end of the magnetoresistive sensor is coupled with the first end of the first shield using a conductor, the conductor including a first nonmagnetic layer and a second magnetic layer.

2. The magnetoresistive head of claim 1 wherein the first end of the second shield is separated from the first end of the first shield by a read gap and wherein the central portion of the second shield is separated from the central portion of the first shield by a distance that is greater than the read gap.

3. The magnetoresistive head of claim 1 wherein the magnetoresistive sensor is a spin valve.

4. The magnetoresistive head of claim 1 wherein the magnetoresistive sensor is a dual spin valve.

5. The magnetoresistive head of claim 1 wherein the magnetoresistive sensor is a synthetic spin valve.

6. The magnetoresistive head of claim 1 wherein the magnetoresistive sensor is a synthetic dual spin valve.

7. The magnetoresistive head of claim 1 wherein the at least one insulating bias layer is adjacent to the magnetoresistive sensor.

8. The magnetoresistive head of claim 1 wherein the magnetoresistive sensor includes at least one free layer and wherein the at least one insulating bias layer magnetically biases the at least one free layer.

9. The magnetoresistive head of claim 1 wherein the distance between the central portion of the first shield and the central portion of the second shield is greater than a read gap because the central portion of the first shield and the central portion of the second shield are recessed.

10. The magnetoresistive head of claim 1 wherein the at least one insulating bias layer further includes at least one insulating hard bias layer.

11. The magnetoresistive head of claim 1 wherein the magnetoresistive sensor is a spin filter.

12. A magnetoresistive head for reading data from a recording media comprising:
    a first shield having a first end, a central portion and a second end, the first end being closer to the recording media during use than the second end;
    a second shield having a first end, a central portion, and a second end, the first end of the second shield being closer to the recording media during use than the second end of the second shield;
    a magnetoresistive sensor disposed between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;
    at least one insulating bias layer magnetically coupled to the magnetoresistive sensor, the at least one insulating bias layer for magnetically biasing at least a portion of the magnetoresistive sensor; and
    a lead electrically coupled with the back end of the magnetoresistive sensor;
    wherein current is driven through the magnetoresistive sensor in a direction substantially perpendicular to the recording media during use; and
    wherein the magnetoresistance sensor has a stripe height that is approximately a flux decay length for the magnetoresistive head.

13. A magnetoresistive head for reading data from a recording media comprising:
    a first shield having a first end, a central portion and a second end, the first end being closer to the recording media during use than the second end;
    a second shield having a first end, a central portion, and a second end, the first end of the second shield being closer to the recording media during use than the second end of the second shield;
    a magnetoresistive sensor disposed between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;

at least one insulating bias layer magnetically coupled to the magnetoresistive sensor, the at least one insulating bias layer for magnetically biasing at least a portion of the magnetoresistive sensor; and a lead electrically coupled with the back end of the magnetoresistive sensor;

wherein current is driven through the magnetoresistive sensor in a direction substantially perpendicular to the recording media during use; and wherein the at least one insulating bias layer further includes at least one bi-layer, the at least one bi-layer including an insulating antiferromagnetic layer and an insulating soft magnetic layer adjacent to the insulating antiferromagnetic layer, at least a portion of the insulating soft magnetic layer being disposed between the magnetoresistive sensor and the insulating antiferromagnetic layer.

14. A method for providing a magnetoresistive head for reading information on a recording media, the method comprising the steps of:

(a) providing a first shield having a first end, a central portion and a second end, the first end being closer to the recording media during use than the second end;

(b) providing a second shield above the first shield, the second shield having a first end, a central portion, and a second end, the first end of the second shield being closer to the recording media during use than the second end of the second shield;

(c) providing a magnetoresistive sensor between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;

(d) providing at least one insulating bias layer magnetically coupled to the magnetoresistive sensor, the at least one insulating bias layer for magnetically biasing at least a portion of the magnetoresistive sensor; and (e) providing a lead electrically coupled with the back end of the magnetoresistive sensor;

wherein current is driven through the magnetoresistive sensor in a direction substantially perpendicular to the recording media during use; and wherein the step of providing the magnetoresistive sensor (c) further includes the step of:

(c1) providing a conductor to electrically couple the front end of the magnetoresistive sensor with the first end of the first shield, the conductor including a first nonmagnetic layer and a second magnetic layer.

15. The method of claim 14 wherein the first end of the second shield is separated from the first end of the first shield by a read gap and wherein the central portion of the second shield is separated from the central portion of the first shield by a distance that is greater than the read gap.

16. The method of claim 14 wherein the step of providing the magnetoresistive sensor (c) further includes the step of:

(c1) providing a spin valve.

17. The method of claim 14 wherein the step of providing the magnetoresistive sensor (c) further includes the step of:

(c1) providing a dual spin valve.

18. The method of claim 14 wherein the step of providing the magnetoresistive sensor (c) further includes the step of:

(c1) providing a synthetic spin valve.

19. The method of claim 14 wherein the step of providing the magnetoresistive sensor (c) further includes the step of:

(c1) providing a synthetic dual spin valve.

20. The method of claim 14 wherein the first shield providing step (a) further includes the step of:

(a1) ensuring that the central portion of the first shield is recessed from the first portion of the first shield.

21. The method of claim 14 wherein the second shield providing step (b) further includes the step of:

(b1) ensuring that the central portion of the second shield is recessed from the first portion of the second shield.

22. The method of claim 14 wherein the magnetoresistive sensor includes at least one free layer and wherein the at least one insulating bias layer magnetically biases the at least one free layer.

23. The method of claim 14 wherein the at least one insulating bias layer providing step (d) further includes the step of:

(d1) providing at least one insulating hard bias layer.

24. The method of claim 15 wherein the magnetoresistive sensor is a spin filter.

25. A method for providing a magnetoresistive head for reading information on a recording media, the method comprising the steps of:

(a) providing a first shield having a first end, a central portion and a second end, the first end being closer to the recording media during use than the second end;

wherein the first shield providing step (a) further includes the step of:

(a1) ensuring that the central portion of the first shield is recessed from the first portion of the first shield;

(b) providing a second shield above the first shield, the second shield having a first end, a central portion, and a second end, the first end of the second shield being closer to the recording media during use than the second end of the second shield;

(c) providing a magnetoresistive sensor between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;

(d) providing at least one insulating bias layer magnetically coupled to the magnetoresistive sensor, the at least one insulating bias layer for magnetically biasing at least a portion of the magnetoresistive sensor; and (e) providing a lead electrically coupled with the back end of the magnetoresistive sensor;

wherein current is driven through the magnetoresistive sensor in a direction substantially perpendicular to the recording media during use;

wherein the second shield providing step (b) further includes the step of:

(b1) ensuring that the central portion of the second shield is recessed from the first portion of the second shield.

26. A method for providing a magnetoresistive head for reading information on a recording media, the method comprising the steps of:

(a) providing a first shield having a first end, a central portion and a second end, the first end being closer to the recording media during use than the second end;

(b) providing a second shield above the first shield, the second shield having a first end, a central portion, and a second end, the first end of the second shield being closer to the recording media during use than the second end of the second shield;

(c) providing a magnetoresistive sensor between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;

(d) providing at least one insulating bias layer magnetically coupled to the magnetoresistive sensor, the at least one insulating bias layer for magnetically biasing at least a portion of the magnetoresistive sensor; and (e) providing a lead electrically coupled with the back end of the magnetoresistive sensor;

wherein current is driven through the magnetoresistive sensor in a direction substantially perpendicular to the recording media during use;

wherein the magnetoresistance sensor has a stripe height that is approximately a flux decay length for the magnetoresistive head.

27. A method for providing a magnetoresistive head for reading information on a recording media, the method comprising the steps of:

(a) providing a first shield having a first end, a central portion and a second end, the first end being closer to the recording media during use than the second end;

(b) providing a second shield above the first shield, the second shield having a first end, a central portion, and a second end, the first end of the second shield being closer to the recording media during use than the second end of the second shield;

(c) providing a magnetoresistive sensor between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield;

(d) providing at least one insulating bias layer magnetically coupled to the magnetoresistive sensor, the at least one insulating bias layer for magnetically biasing at least a portion of the magnetoresistive sensor; and (e) providing a lead electrically coupled with the back end of the magnetoresistive sensor;

wherein current is driven through the magnetoresistive sensor in a direction substantially perpendicular to the recording media during use;

wherein the at least one insulating bias layer providing step (d) further includes the step of:

(d1) providing at least one bi-layer, the at least one bi-layer including the steps of (d1i) providing an insulating antiferromagnetic layer; and (d1ii) providing an insulating soft magnetic layer adjacent to the insulating antiferromagnetic layer, at least a portion of the insulating soft magnetic layer being disposed between the magnetoresistive sensor and the insulating antiferromagnetic layer.

* * * * *